United States Patent [19]
Yoshida

[11] Patent Number: 5,725,204
[45] Date of Patent: Mar. 10, 1998

[54] IDLER SHOCK-ABSORBING DEVICE FOR CRAWLER BELT

[75] Inventor: Tsuyoshi Yoshida, Katano, Japan

[73] Assignee: Kabushiki Kaisha Komatsu Seisakusho, Tokyo, Japan

[21] Appl. No.: 615,023

[22] Filed: Mar. 13, 1996

[51] Int. Cl.$^6$ ............... B60G 11/14; B62D 65/14
[52] U.S. Cl. ............... 267/289; 267/221; 305/154
[58] Field of Search ............... 188/112 R, 129, 188/166, 167, 136; 267/202, 203, 211, 216, 221, 224, 225, 289, 33; 305/143, 146, 151, 152, 153, 154, 155; 180/9.1, 9.56

[56] References Cited

U.S. PATENT DOCUMENTS

| | | | |
|---|---|---|---|
| 2,747,696 | 5/1956 | Blattner | 188/129 |
| 2,917,303 | 12/1959 | Vierling | 267/221 |
| 3,765,730 | 10/1973 | Ishida | 305/154 |
| 5,511,868 | 4/1996 | Eftefield | 305/154 |

FOREIGN PATENT DOCUMENTS

| | | |
|---|---|---|
| 45-16983 | 7/1970 | Japan. |
| 59-7183 | 3/1984 | Japan. |

*Primary Examiner*—Chris Schwartz
*Attorney, Agent, or Firm*—Sidley & Austin

[57] ABSTRACT

A shock-absorbing device, suitable for use with an idler for a crawler belt, contains a spring box (10) having a flange (12) secured at one end and a bracket (13) secured at the other end, with an annular partition wall (11) extending radially inwardly from a central portion of the wall of the bore of the spring box (10) to form a first spring chamber (16) and a second spring chamber (17) spaced apart along the length of the spring box (10). A first spring (23) and a first spring pushing member (20) are installed in the first spring chamber (16), and a second spring (33) and a second spring pushing member (30) are installed in the second spring chamber (17). An external force F, applied to an idler (3) and a guide bar (18), is propagated through the first holder (21) of the first spring pushing member (20) to the first spring (23), and then, after the first spring (23) has been compressed a predetermined amount, through the first elongated member (26) to the second holder (31) of the second spring pushing member (30) to compress the second spring (33). The load of the device is the load of only the first spring (23) until the first spring (23) has been compressed the predetermined amount and then the load is the sum of the loads of the first and second springs (23, 33).

20 Claims, 6 Drawing Sheets

IDLER SHOCK-ABSORBING DEVICE FOR CRAWLER BELT

FIELD OF THE INVENTION

The present invention relates to a shock-absorbing device, suitable for use with an idler for a crawler belt on a crawler-mounted vehicle, to absorb shock experienced by the crawler belt or to prevent abnormal tension because earth, sand, and the like become caught in the mechanism of the crawler belt.

BACKGROUND OF THE INVENTION

FIG. 1 is a side elevational view of a bulldozer, which is one type of crawler-mounted vehicle with a crawler belt device arranged on each of two sides of the body of the vehicle 1. Each crawler belt device comprises a track frame 2, an idler 3, a sprocket 4 which drives the crawler belt 5, and an idler shock-absorbing device 6. The idler 3 is installed at the front end of the track frame 2, the sprocket 4 is installed at the rear end of the track frame 2, and the crawler belt 5 is wound on each of the idler 3 and the sprocket 4. The idler 3 is biased forwardly against the crawler belt 5 by a spring (not shown), which is installed in the idler shock-absorbing device 6 mounted to the track frame 2.

FIG. 4 is a longitudinal cross-section of a conventional idler shock-absorbing device 6 for a crawler belt 5, wherein an annular flange 51 is secured by a plurality of bolts 53 at the front end of a tubular spring box 50, which is fixed to the track frame 2, and an annular bracket 52 is secured by a plurality of bolts 54 to the rear end of the spring box 50. The spring box 50 has an internal bore forming a spring chamber, which has a diameter that is greater than an internal diameter of the annular flange 51, whereby the flange 51 provides an annular shoulder facing the interior of the spring box 50.

The annular holder 60 is positioned within a front end portion of the spring chamber of the spring box 50 with the front end of the annular holder 60 being in contact with the annular shoulder of the flange 51, and the annular pilot ring 61 is positioned within a rear end portion of the spring chamber of the spring box 50 with the rear end of the annular pilot ring 61 being in contact with the bracket 52. Each of the annular holder 60 and the annular pilot ring 61 has a longitudinally extending hole located approximately at its center, and a headed rod 63 is inserted through these holes and is secured by a nut 64 being threadedly engaged with the non-head end of the rod 63. A spiral spring 62, which is compressed to a predetermined length, is positioned coaxially with the rod 63 within the spring chamber of the spring box 50 and between the holder 60 and the pilot ring 61 so that the spring 62 is held by the holder 60 and the pilot ring 61. While the spring 62 has limited extension movement in its initial position, it is possible to further compress the spring 62 beyond its compression at its initial position.

When earth, sand, and the like are caught between the sprocket 4 and the crawler belt 5 of the bulldozer during an earthworking operation, the spring 62 of the idler shock-absorbing device 6 is then further compressed beyond the compression of its initial position so that the idler 3 is moved backwardly to prevent the crawler belt 5 from being abnormally stretched. A guide 70 and a yoke 71, which supports the idler 3, are slidably inserted into the axial opening through the annular flange 51 as far as possible so that the guide 70 is brought into contact with the holder 60. A piston 73 is slidably inserted into a piston cylinder 72, provided within a rear end portion of the yoke 71, and a rod 74 of the piston 73 is brought into contact with the front end of the guide 70.

The portion of the piston cylinder 72 in front of the piston 73 constitutes a cylinder chamber 75 which can be filled with grease, and the position of the idler 3 can be adjusted by varying the amount of grease in the cylinder chamber 75.

In the assembling of the idler shock-absorbing device of FIG. 4, the length of the spring 62 is set to a predetermined length by the combination of the holder 60, the pilot ring 61, the rod 63, and the nut 64. Next, the thus set spring assembly is positioned within the spring box 50, the flange 51 is bolted to the front end of the spring box 50 by the plurality of bolts 53, and the bracket 52 is bolted to the back end of the spring box 50 by the plurality of bolts 54. The axial length of the spring box 50 and the axial length of the portion of the pilot ring 61 in front of the nut 64 are selected so that in the initial position of the device there is a longitudinally extending gap W between the head of the rod 63 and the adjacent portion of the front end of the holder 60.

When a strong tension is applied to the crawler belt 5, an external force F, as shown by an arrow in FIG. 4, is applied to the idler 3. The idler 3 is then moved backwardly, compressing the spring 62 via the grease in the cylinder chamber 75, the piston 73, the guide 70, and the holder 60. Next, upon the termination of the external force F, the compressed spring 62 extends and the holder 60 is moved forwardly until the holder 60 is brought into contact with the rearwardly facing shoulder of the flange 51. While a shock force is generated at this time, the shock force is applied to the bolts 53 and not to the rod 63, because there is still a gap W between the head of the rod 63 and the holder 60.

The desired installation load of the spring 62 is related to the weight of the vehicle. The larger the vehicle is, the larger the installation load which is necessary. Therefore, for a large vehicle, in general, various elements (wire diameter, mean diameter, etc.) of the spring 62 are made greater or, when a sectional space of the track frame 2 is insufficient, a smaller spring 65 is additionally installed inside of the main spring 62, as shown in FIG. 5. The remainder of this alternate structure of FIG. 5 is the same as that shown in FIG. 4. Examples of an idler shock-absorbing device, in which the small spring 65 is installed inside the large spring 62, are disclosed in Japanese Utility Model Publication No. (Y2) 45-16983 and Japanese Utility Model Publication No. (Y2) 59-7183.

In FIG. 6, the dashed line F3 represents a relationship between the load and the stroke for a conventional large diameter single spring 62, and the solid line F4 represents a relationship between the load and the stroke for a combination of the large diameter spring 62 and the small diameter spring 65 which is coaxially mounted within the large diameter spring 62. For example, when the load F3 on the large-diameter spring 62 is 50 tons, the load F4 on the combination can be increased by 40% to 50% of the 50 tons.

However, when the vehicle gets larger, the conventional idler shock-absorbing device has problems such as set forth below:

(1) When the section of space of the track frame part available for the shock absorbing device is insufficient, it is difficult to achieve the desired predetermined installation load by merely making the spring larger (i.e., making the wire diameter and the outer diameter greater).

(2) If a new product is manufactured by making the spring larger, the cost will increase greatly.

(3) As the spring load is the sum of the large spring load and the small spring load and a spring constant consists of the large spring constant and the small spring constant, it is not possible to be able to sharply increase the load in a structure where the small spring is provided in parallel inside the large spring.

SUMMARY OF THE INVENTION

Aiming at such problems, an object of the present invention is to provide a shock-absorbing device suitable for use with an idler for a crawler belt where it is possible to get a large spring load in a small sectional space.

According to the present invention, in a shock-absorbing device provided with a spring box having a spring pushing member that absorbs an external force, a flange secured at the front end of the spring box, and a bracket secured at the rear end of the spring box, the spring box is provided with an annular partition wall extending radially inwardly from the inner surface of a central portion of the longitudinally extending bore of the spring box to form first and second spring chambers which are spaced apart along the longitudinal axis of the spring box. A first spring and a first spring pushing member are installed in the first spring chamber, and a second spring and a second spring pushing member are installed in the second spring chamber.

The first spring pushing member can comprise a first holder and a first elongated member, with a rearwardly facing surface of the first holder being positioned in contact with a first end of the first spring, and a front surface of the first holder being positionable in contact with the flange, which is secured to the front end of the spring box, and the rear end surface of a guide bar of the idler. The first elongated member is positioned within the central space defined by the first spring and is coaxial to the first spring, with the front end of the first elongated member being in contact with the rearwardly facing surface of the first holder, and the rear end of the first elongated member being movable through the opening in the annular partition wall, when the first spring is sufficiently compressed by the external force applied to the idler, to a position wherein the first elongated member transmits a force to the second spring pushing member to thereby compress the second spring.

The second spring pushing member can comprise a second holder, with one end of the second holder being in contact with one end of the second spring, and the other end of the second holder being positionable in contact with at least one of the annular partition wall of the spring box and the first spring pushing member. A second elongated member can be positioned within the central space of the second spring, so that one end of the second elongated member can be in contact with the bracket secured to the rear end of the spring box and the other end of the second elongated member can be brought into contact with the second holder when the second holder is moved sufficiently by the first spring pushing member in response to the external force applied to the idler, to thereby limit the maximum movement of the second holder.

Further, in the absence of an external force applied to the idler, the first and second spring pushing members are positioned so that there is a gap between the first spring pushing member and the second holder in a direction parallel to the longitudinal axis of the bore. In addition, in the absence of an external force applied to the idler, there is a gap between the second holder and the second elongated member.

When an external force is applied to the idler, the external force is propagated through the guide bar to the first holder of the first spring pushing member to compress (contract) the first spring. After a short delay, the first elongated member, which is in contact with the first holder, is moved into contact with the second holder of the second spring pushing member to compress (contract) the second spring. Before the first elongated member is brought into contact with the second holder, the spring load is that of only the first spring. While the first elongated member is in contact with the second holder, the spring load is the sum of the spring force of the first spring and the spring force of the second spring. Thus, with two such springs of equal spring force, it is possible to double the spring force without changing the sectional space of the spring.

Upon the external force applied to the idler being removed, each of the first spring and the second spring extends and returns to its original position. While this brings the second holder into contact with the annular partition wall, the resulting shock force due to the second spring is applied only to the bolts of the bracket at the rear end of the spring box. As a gap is provided between the first elongated member and the second holder, the first holder makes contact with the flange at the front end of the spring box after a slight delay. Then the shock force due to the first spring is applied only to the bolts of the flange. In other words, as the spring force applied to each set of bolts is the single force of only the first spring or only the second spring, and not the sum of them, it is possible to make each of the bolts of a smaller size, thereby permitting the size of the spring box to be smaller.

Further, the maximum stroke (moving distance) of the idler shock-absorbing device can be limited by providing a gap between the second holder of the second spring pushing member and the second elongated member in the absence of the external force, so that when the external force is applied, the second holder is brought into contact with the second elongated member upon the maximum stroke being reached.

DETAILED DESCRIPTION OF THE PREFERRED EMBODIMENT

Figure 1:
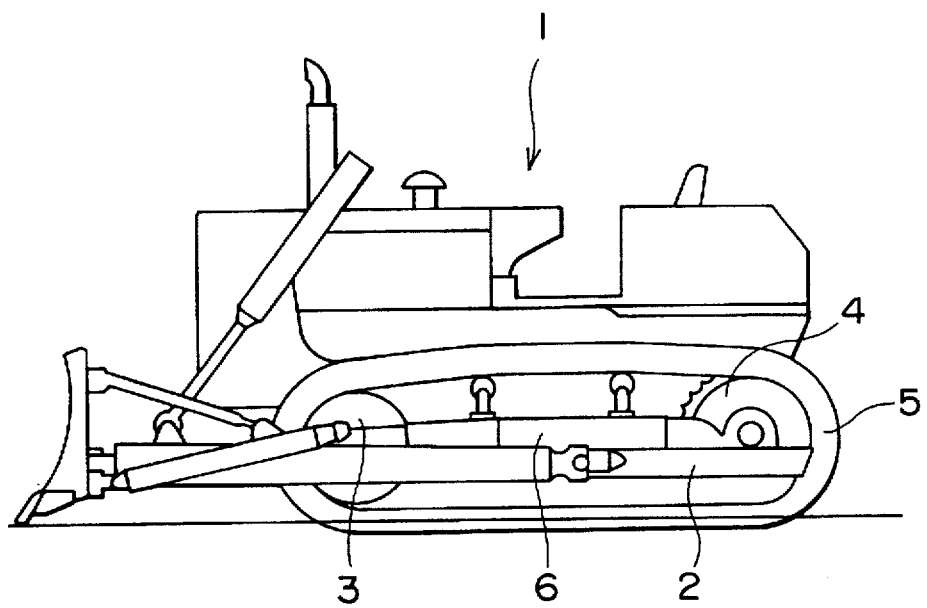
FIG. 1 is a sketch drawing of a side of a bulldozer, which is one type of crawler-mounted vehicle.

An embodiment of a shock-absorbing device suitable for use with an idler for a crawler belt according to the present invention will be described in detail referring to FIGS. 1 to 3.

Figure 2:
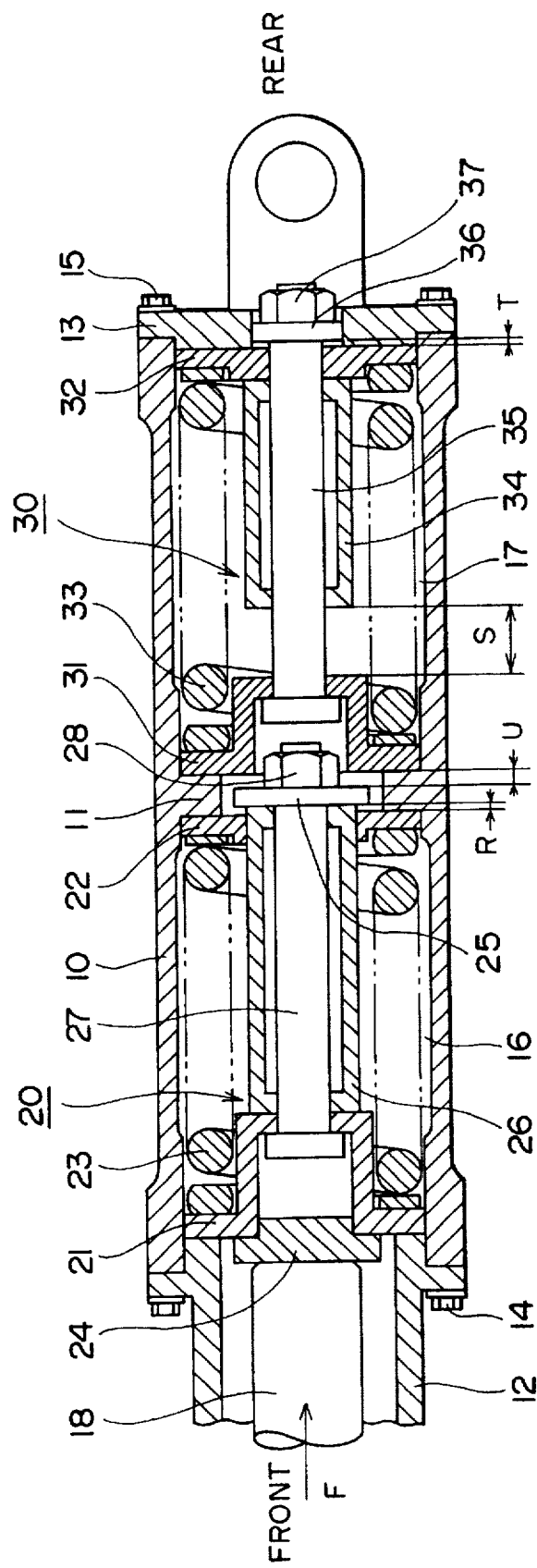
FIG. 2 is a cross-section along the length of an idler shock-absorbing device of the present invention.

A tubular spring box 10 of an idler shock-absorbing device, as shown in FIG. 2, has first and second ends spaced apart from each other, and a bore extending from the first end to the second end. The bore has a longitudinal axis and an annular bore wall which is generally coaxial with the longitudinal axis. The annular flange 12 is secured to the first end of the spring box 10 by a plurality of bolts 14, and the annular bracket 13 is secured to the second end of the spring box 10 by a plurality of bolts 15. The spring box 10 is provided with an annular partition wall 11 which extends radially inwardly from a longitudinally intermediate portion of the wall of the bore in the spring box 10, to thereby form the first spring chamber 16 between the first end of the spring box 10 and the annular partition wall 11, and to form the second spring chamber 17 between the annular partition wall 11 and the second end of the spring box 10, so that the first and second spring chambers 16, 17 are spaced apart from each other along the longitudinal axis of the bore of the spring box 10. As shown in FIG. 2, the partition wall 11 is an integral part of the spring box 10 and is fixedly located therein. The annular partition wall 11 is preferably located at the longitudinal center of the spring box 10. The annular partition wall 11 has a central opening extending longitudinally therethrough which is coaxial with the longitudinal axis of the bore of the spring box 10. The diameter of the first spring chamber 16 is greater than the internal diameter of the adjacent end of the annular flange 12, whereby the flange 12 provides an annular shoulder facing the interior of the first spring chamber 16.

A first spring 23 and a first spring pushing member 20, for varying the compression of the first spring 23, are positioned within the first spring chamber 16. The first spring 23 has a longitudinal axis which is at least generally parallel to the longitudinal axis of the bore of the spring box 10. The first spring 23 is a spiral coil spring, which is under an initial partial compression, and has an interior central space which extends along the longitudinal axis of the first spring 23. The first spring pushing member 20 comprises a first holder 21 and a first elongated member, described infra.

The orientation of the first holder 21 in the first spring chamber 16 is such that the first holder 21 has a first, or front, surface which faces in a first direction, which is parallel to the longitudinal axis of the bore of the spring box 10, and a second, or rear, surface which faces in a second direction which is parallel to the longitudinal axis of the bore of the spring box 10 and opposite to the first direction. The first holder 21 is positioned in the first spring chamber 16 so that the first, or front, surface of the first holder 21 is in contact with the annular shoulder, formed by the rear end surface of the flange 12, and the second, or rearwardly facing, surface of the first holder 21 is in contact with the front end of the first spring 23. A first pilot ring 22 is positioned between and in contact with the rear end of the first spring 23 and the annular partition wall 11, so that the first spring 23 is held by the first holder 21 and the first pilot ring 22. The thickness of the first holder 21 and/or the thickness of the first pilot ring 22 can be selected to set the first spring 23 at the predetermined desired installation load (i.e., the initial loading). The central portion of the first holder 21 can be in the form of a cup opening to the front and having an external diameter only slightly smaller than the external diameter of the first spring 23, thereby providing a stabilizing boss for the front end portion of the first spring 23.

A pad 24 is positioned between the rear end of the guide bar 18, which is connected to the idler 3, and the center of the front surface of the first holder 21. When an external force F is applied to the idler 3, guiding the crawler belt 5, the external force F is applied to the first holder 21 via the movement of the guide bar 18 and the pad 24 along the longitudinal axis of the bore of the spring box 10, as shown by the arrow through the guide bar 18 in FIG. 2, thereby causing the first holder 21 to move backwardly along the longitudinal axis of the bore of the spring box 10. Thus, the guide bar 18 serves to transmit a motion of the idler 3 to the first spring pushing member 20.

In the illustrated embodiment, the first elongated member comprises an annular plate 25, a first tubular member 26, and a first rod or bolt 27. The first tubular member 26, having a predetermined length, is positioned within the central interior space of the first spiral spring 23 so as to extend coaxially with the longitudinal axis of the bore of the spring box 10, with the front end of the tubular member 26 being in contact with the center of the rear end surface of the first holder 21 and the rear end portion of the tubular member 26 extending along the longitudinal axis of the bore of the spring box 10 through the central opening in the first pilot ring 22 and into the central opening in the annular partition wall 11. The first rod 27, having a predetermined length with a head at its front end and a threaded portion at its rear end, is inserted through the central opening in the first holder 21, through the bore of the tubular member 26, and through the central opening in the annular plate 25, with the head of the first rod 27 being in contact with a portion of a forwardly facing surface of the first holder 21, and then the nut 28 is positioned in threaded engagement with the threaded end portion of the rod 27. Thus, the first holder 21, the plate 25, the first tubular member 26, and the rod 27 are combined integrally together as a first spring assembly.

The lengths of the first rod 27 and the first tubular member 26 are selected so that, with the first spring 23 set at its initial compression position, there is a gap R between the first pilot ring 22 and the first plate 25 in a direction parallel to the longitudinal axis of the bore of the spring box 10.

A second spring 33 and a second spring pushing member 30, for varying the compression of the second spring 33, are positioned within the second spring chamber 17. The second spring 33 has a longitudinal axis which is at least generally parallel to the longitudinal axis of the bore of the spring box 10. The second spring 33 is a spiral coil spring, which is under an initial partial compression, and has an interior space which extends along the longitudinal axis of the second spring 33. The second spring pushing member 30 comprises a second holder 31.

The orientation of the second holder 31 in the second spring chamber 17 is such that the second holder 31 has a first, or front, surface which faces in a first direction, which is parallel to the longitudinal axis of the bore of the spring box 10, and a second, or rear, surface which faces in a second direction which is parallel to the longitudinal axis of the bore of the spring box 10 and opposite to the first direction. The second holder 31 is positioned in the second spring chamber 17 so that the first, or front, surface of the second holder 31 is in contact with at least one of the annular partition wall 11 and the rearwardly facing surface of the plate 25, and the front end of the second spring 33 is in contact with the second, or rearwardly facing, surface of the second holder 31. Thus, a movement of the first elongated member along the longitudinal axis of the bore of the spring box 10 can cause a corresponding movement of the second holder 31 along the longitudinal axis of the bore of the spring box 10 when the first elongated member is in contact with the second holder 31. The central portion of the second holder 31 can be in the form of a cup opening to the front and having an external diameter only slightly smaller than the external diameter of the second spring 33, thereby providing a stabilizing boss for the front end portion of the second spring 33.

A second pilot ring 32 is positioned between and in contact with the front surface of the bracket 13 and the rear end of the second spring 33. Thus, the second spring 33 is held by the second holder 31 and the second pilot ring 32. The thickness of the second holder 31 and/or the thickness of the second pilot ring 32 can be selected to set the second spring 33 to the predetermined desired installation load.

A second elongated member, in the form of a second tubular member 34 having a predetermined length, is installed within the central interior space of the second spring 33 between the second holder 31 and the second pilot ring 32. The length of the second tubular member 34 is selected so that, in the absence of any external force F on the guide bar 18, a gap S is provided between the second holder 31 and the front end of the second tubular member 34 in a direction parallel to the longitudinal axis of the bore of the spring box 10, while the rear surface of the second holder 31 will contact the front end surface of the second tubular member 34 when the second holder 31 has moved sufficiently toward the bracket 13 to thereby limit the maximum stroke of the idler shock-absorbing device while the external force F is applied to the guide bar 18.

The second rod 35, having a predetermined length with a head at its front end and a threaded portion at its rear end, is inserted through the central opening in the second holder 31, through the bore of the tubular member 34, through the central opening in the second pilot ring 32, and through the central opening in the second annular plate 36, with the head of the second rod 35 being in contact with a portion of a forwardly facing surface of the second holder 31, and then the nut 37 is positioned in threaded engagement with the threaded end portion of the second rod 35. Thus, the second holder 31, the second tubular member 34, the second rod 35, and the second plate 36 are combined integrally together as a second spring assembly. The bracket 13 is provided with a central opening for slidably receiving the second plate 36 and the nut 37 therein, thereby permitting the rod 35 to move with respect to the bracket 13 along the longitudinal axis of the spring box 10.

The length of the second rod 35 is selected so that, with the second spring 33 set at its initial compression position, there can be a gap T between the second pilot ring 32 and the second plate 36. Further, in the absence of an external force F being applied through the guide bar 18 and the first spring pushing member 20, there is a gap U between the rear end of the plate 25 of the first elongated member and the front surface of the second holder 31 in a direction parallel to the longitudinal axis of the bore of the spring box 10. Accordingly, the second end of the first elongated member is positionable for transmitting a motion of the first elongated member to the second spring pushing member 30 when the first spring 23 is compressed beyond the predetermined degree of compression corresponding to the distance U by an external force applied through the guide bar 18. Thus, when the first holder 21 is moved rearwardly farther than the distance U, the force F is applied through the first holder 21, the first tubular member 26, and the first plate 25 to the second holder 31 so that the second holder 31 is moved with the first holder 21 to thereby compress the second spring 33.

Next, actuations of the idler shock-absorbing device will be described.

When the external force F is applied to the idler 3, guiding the crawler belt 5, the first holder 21 has the external force F applied, as shown by the arrow in FIG. 2, through the guide bar 18 and the pad 24. The first spring 23, to which the external force F is transmitted by the first holder 21, is compressed beyond its initial compression. When the first spring pushing member 20 is moved rearwardly by the stroke U, the first plate 25 is brought into contact with the second holder 31, and the second spring 33 is then compressed beyond its initial compression. That is, the load of the spring is only that of the first spring 23 during the stroke U, and is the sum of the spring force of the first spring 23 and the second spring 33 when the stroke is longer than the distance U. Therefore, through this idler shock-absorbing device, it is possible to get a large spring force in a small sectional space. The invention is particularly effective when it is impossible to use a large spring owing to limitations of the sectional space of the section of the track frame 6.

Upon the removal of the external force F, applied to the idler 3, the first spring 23 and the second spring 33 extend and return to their original positions. Thus, the second holder 31 is brought into contact with the partition wall 11, and the shock force due to the second spring 33 is applied through the bracket 13 to the bolts 15. As the first plate 25 then separates from the second holder 31 and travels the distance U to provide the gap U between the first plate 25 and the second holder 31, there is a slight delay before the first holder 21 is brought into contact with the flange 12. Then the shock force due to the first spring 23 is applied to the bolts 14. That is, the spring force applied to the bolts 14 or to the bolts 15 is only that of the single spring force of either the first spring 23 or the second spring 33, respectively, and is not the sum of the spring force of the first spring 23 and the spring force of the second spring 33. Thus, it is possible to make each of the bolts 14 and 15 smaller than in the case of one large spring having the same load characteristic as the sum of the forces of the two springs 23 and 33.

Figure 3:
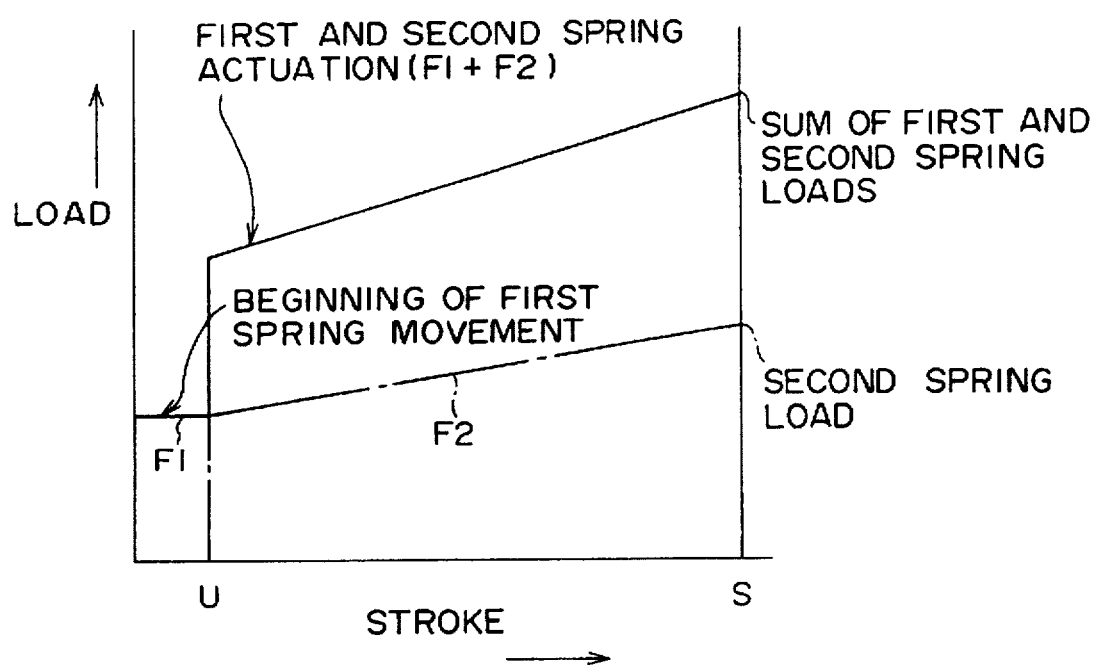
FIG. 3 is a diagram of the relationship of the spring load to the stroke of the idler shock-absorbing device of the present invention.
Figure 4:
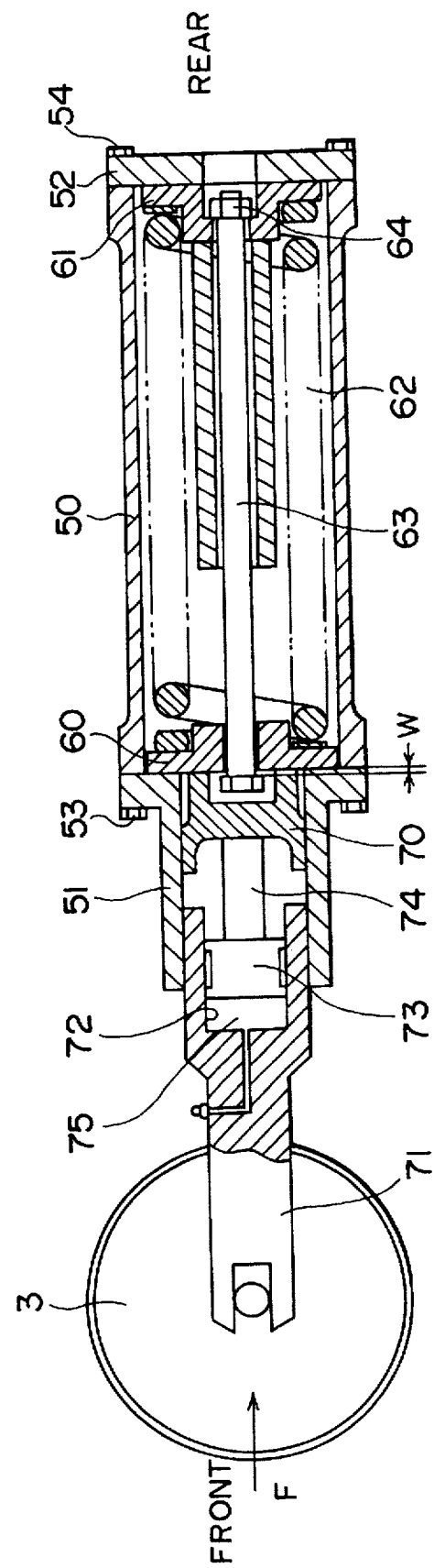
FIG. 4 is a cross-section along the length of a first conventional idler shock-absorbing device.
Figure 5:
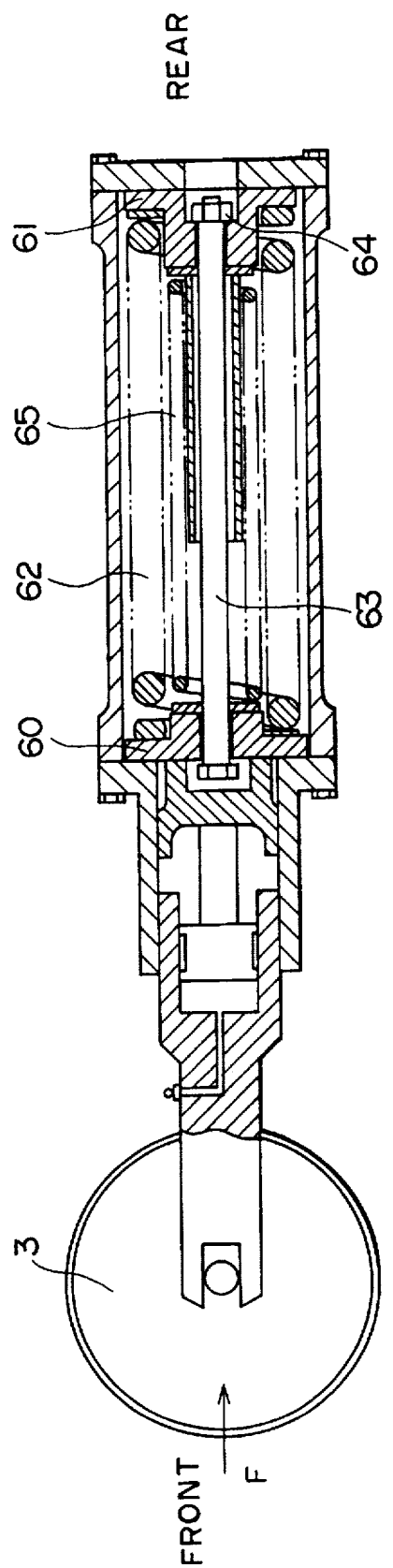
FIG. 5 is a cross-section along the length of a second conventional idler shock-absorbing device.
Figure 6:
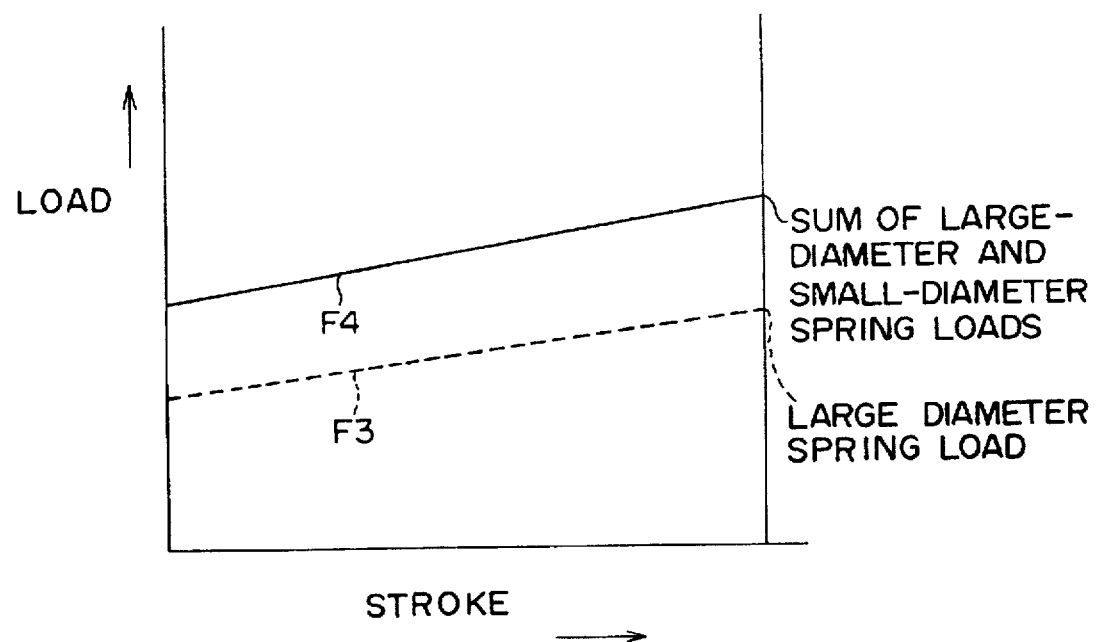
FIG. 6 is a diagram of spring load to stroke of the conventional idler shock-absorbing device.

A relationship between the load and the stroke of the first spring 23 and the second spring 33 is shown in FIG. 3. Until the compression stroke of the first spring 23 reaches the distance U, the spring force is only the load F1 of the first spring 23; and when the compression stroke of the first spring 23 exceeds the distance U, the spring force is the sum (F1+F2) of the load F1 of the first spring 23 and the load F2 of the second spring 33. For example, when the load F1 of the first spring 23 is 50 tons, the sum of the two loads can be double the load F1.

As, in the idler shock-absorbing device of the present invention, the first spring 23 and the second spring 33 are arranged in series, it is possible to achieve a large spring force in a small sectional space, and it is possible to easily achieve the characteristic of the desired load by combining the two springs without changing the sectional space. Therefore, even if the wire diameter of the spring is not made greater, the idler shock-absorbing device of the present invention will be useful as a shock-absorbing device for the idler 3 of the crawler belt 5, and it is also possible to apply the shock-absorbing device to a large-sized crawler-mounted vehicle.

Further, as the spring force applied to the set of bolts 14 or to the set of bolts 15 is the single load F1 of the first spring 23 or F2 of the second spring 33, and not the sum (F1+F2) of the two loads, it is possible to miniaturize each of the bolts 14 and 15 and to make the spring box 10 compact.

Reasonable variations and modifications are possible within the scope of the foregoing description, the drawings and the appended claims to the invention.

That which is claimed:

1. A shock-absorbing device which is suitable for use with an idler which guides a crawler belt, said shock-absorbing device comprising:

a spring box having a first end and a second end spaced apart from each other, and a bore extending from said first end to said second end, said bore having a longitudinal axis and an annular bore wall which is generally coaxial with said longitudinal axis;

an annular flange secured to said first end of said spring box;

an annular bracket secured to said second end of said spring box;

an annular partition wall extending radially inwardly from and integral with a longitudinally central portion of said bore wall to thereby form a first spring chamber between said first end of said spring box and said annular partition wall and a second spring chamber between said annular partition wall and said second end of said spring box, so that said first and second spring chambers are spaced apart from each other along said longitudinal axis, said annular partition wall having a central opening through which the longitudinal axis of said bore extends;

a first compression spring positioned in said first spring chamber;

a second compression spring positioned in said second spring chamber, each of said first and second compression springs having a first end and a second end;

a first spring pushing member positioned in said first spring chamber for varying the compression of said first compression spring; and a second spring pushing member positioned in said second spring chamber for varying the compression of said second compression spring.

2. A shock-absorbing device in accordance with claim 1, wherein each of said first and second compression springs is a spiral spring under an initial partial compression, each of the spiral springs having a longitudinal axis which is at least generally parallel to the longitudinal axis of said bore, and each of the spiral springs having an interior space which extends along the longitudinal axis of the respective spiral spring.

3. A shock-absorbing device in accordance with claim 2, further comprising a guide bar for transmitting a motion to said first spring pushing member.

4. A shock-absorbing device in accordance with claim 3, wherein said first spring pushing member comprises:

a first holder having first surface facing in a first direction, said first direction being parallel to the longitudinal axis of said bore, and second surface facing in a second direction, said second direction being parallel to the longitudinal axis of said bore and opposite to said first direction; and a first elongated member having a first end and a second end;

wherein said first surface of said first holder is positionable in contact with said flange, wherein said second surface of said first holder is positioned in contact with a first end of said first compression spring, and wherein a movement of said guide bar along said longitudinal axis of said bore can cause a movement of said first holder along the longitudinal axis of said bore;

wherein said first elongated member is positioned within the interior space of said first compression spring with said first end of said first elongated member being positioned in contact with said second surface of said first holder and said second end of said first elongated member being positionable for transmitting a motion of said first elongated member to said second spring pushing member, when said first compression spring is compressed beyond a predetermined degree of compression by an external force applied through said guide bar, to thereby compress said second compression spring.

5. A shock-absorbing device in accordance with claim 4, wherein said second spring pushing member comprises a second holder having first surface facing in said first direction and second surface facing in said second direction;

wherein said first surface of said second holder is positionable in contact with at least one of said annular partition wall and the second end of said first elongated member, wherein said second surface of said second holder is positioned in contact with a first end of said second compression spring, and wherein a movement of said first elongated member along the longitudinal axis of said bore can cause a movement of said second holder along the longitudinal axis of said bore.

6. A shock-absorbing device in accordance with claim 5, further comprising a second elongated member positioned within said second spring chamber, said second elongated member having a first end and a second end, wherein said second elongated member is positioned within the interior space of said second compression spring with said first end of said second elongated member being positionable in contact with said second surface of said second holder when said second holder has moved sufficiently toward said bracket, and wherein, in the absence of said external force being applied through said first spring pushing member, there is a gap between the first end of the second elongated member and said second surface of said second holder in a direction parallel to the longitudinal axis of said bore.

7. A shock-absorbing device in accordance with claim 6, further comprising an annular ring positioned in said second spring chamber between said bracket and said second compression spring, and wherein the second end of said second elongated member is positioned in contact with said annular ring.

8. A shock-absorbing device in accordance with claim 5, wherein, in the absence of said external force being applied through said guide bar, there is a gap between the second end of the first elongated member and said first surface of said second holder in a direction parallel to the longitudinal axis of said bore.

9. A shock-absorbing device in accordance with claim 8, further comprising a first annular ring positioned in said first spring chamber between and in contact with the second end of said first compression spring and said annular partition wall, said first annular ring having an opening therethrough along the longitudinal axis of said bore, wherein said first elongated member comprises a first tubular member and a plate, said first tubular member having a first end and a second end with the first end of said first tubular member being positioned in contact with said second surface of said first holder, said plate being positioned in contact with said second end of said first tubular member, wherein said first tubular member slidably extends through the opening in said first annular ring, and wherein, in the absence of said external force being applied through said guide bar, there is a gap between said plate and said first annular ring in a direction parallel to the longitudinal axis of said bore.

10. A shock-absorbing device in accordance with claim 9, wherein said first elongated member further comprises a bolt securing together said first holder, said first tubular member and said plate.

11. A shock-absorbing device in accordance with claim 1, wherein said first spring pushing member comprises:

a first holder having first surface facing in a first direction, said first direction being parallel to the longitudinal axis of said bore, and second surface facing in a second direction, said second direction being parallel to the longitudinal axis of said bore and opposite to said first direction; and a first elongated member having a first end and a second end;

wherein said first surface of said first holder is positionable in contact with said flange, wherein said second surface of said first holder is positioned in contact with a first end of said first compression spring, and wherein a movement of said first holder along said longitudinal axis of said bore toward said annular partition wall causes an increase in the compression of said first compression spring and a movement of said first elongated member toward said second spring pushing member;

wherein said first elongated member is positioned within an interior space of said first compression spring with said first end of said first elongated member being positioned in contact with said second surface of said first holder and said second end of said first elongated member being positionable for transmitting a motion of said first elongated member to said second spring pushing member, when said first compression spring is compressed beyond a predetermined degree of compression by an external force applied through said first holder, to thereby compress said second compression spring.

12. A shock-absorbing device in accordance with claim 11, wherein said second spring pushing member comprises a second holder having first surface facing in said first direction and second surface facing in said second direction;

wherein said first surface of said second holder is positionable in contact with at least one of said annular partition wall and the second end of said first elongated member, wherein said second surface of said second holder is positioned in contact with a first end of said second compression spring, and wherein a movement of said first elongated member along the longitudinal axis of said bore can cause a movement of said second holder along the longitudinal axis of said bore.

13. A shock-absorbing device in accordance with claim 1, wherein, in the absence of an external force being applied through said first spring pushing member, there is a gap between an end of the first spring pushing member and an adjacent end of said second spring pushing member in a direction parallel to the longitudinal axis of said bore.

14. A shock-absorbing device in accordance with claim 13, further comprising a first annular ring positioned in said first spring chamber between and in contact with an end of said first compression spring and said annular partition wall, said first annular ring having an opening therethrough along the longitudinal axis of said bore, wherein said first spring pushing member comprises a first holder, an elongated member, and a plate, wherein said first compression spring is positioned between and in contact with said first holder and said first annular ring, wherein said first elongated member slidably extends through an opening in said first annular ring, wherein said plate is secured to an end of said first elongated member which is remote from said first holder, and wherein, in the absence of said external force being applied through said first spring pushing member, there is a gap between said plate and said first annular ring in a direction parallel to the longitudinal axis of said bore.

15. A shock-absorbing device in accordance with claim 1, wherein said first and second spring pushing members are positioned within said spring box such that said first spring pushing member has to increase the compression of said first compression spring a predetermined amount before said first spring pushing member can contact said second spring pushing member and thereby cause said second spring pushing member to increase the compression of said second compression spring.

16. A shock-absorbing device which is suitable for connection to an idler guiding a crawler belt, said shock-absorbing device comprising:

a first spring and a second spring which are suitable for absorbing an external force applied to the idler;

a spring box having a front end and a rear end and a bore having a bore wall extending from said front end to said rear end, said spring box containing said first spring and said second spring, said spring box having a partition wall protruding radially inwardly from and integral with said bore wall at the center of a longitudinal direction of the spring box to thereby form a first spring chamber between said front end and said partition wall and a second spring chamber between said partition wall and said rear end;

a flange bolted to the front end of the spring box;

a bracket bolted to the rear end of the spring box;

said first spring and a first spring pushing member being positioned in said first spring chamber; and said second spring and a second spring pushing member being positioned in the second spring chamber.

17. A shock-absorbing device which is suitable for connection to an idler guiding a crawler belt, said shock-absorbing device comprising:

a first spring and a second spring which are suitable for absorbing an external force applied to the idler;

a spring box having a front end and a rear end, said spring box containing said first spring and said second spring, said spring box having a partition wall protruding radially inwardly at the center of a longitudinal direction of the spring box to thereby form a first spring chamber between said front end and said partition wall and a second spring chamber between said partition wall and said rear end;

a flange bolted to the front end of the spring box;

a bracket bolted to the rear end of the spring box;

said first spring and a first spring pushing member being positioned in said first spring chamber;

said second spring and a second spring pushing member being positioned in the second spring chamber;

a guide bar which is capable of being connected to an idler for transmitting a force applied to the idler;

wherein said first spring pushing member comprises a first holder and a first tubular member;

wherein one end of said first holder is in contact with an end surface of said first spring, and another end of said first holder can be in contact with said flange bolted to the front end of said spring box and an end surface of said guide bar; and wherein said first tubular member is positioned within said first spring, one end of said first tubular member being in contact with one end of said first holder, and the other end of the first tubular member being movable into contact with said second spring pushing member when said first spring is compressed by an external force applied to said guide bar, to thereby compress said second spring.

18. A shock-absorbing device in accordance with claim 17, wherein said second spring pushing member comprises a second holder and a second tubular member;

wherein one end of said second holder is in contact with an end surface of said second spring and the other end of said second holder can be moved into contact with said partition wall and into contact with said first spring pushing member when said first spring is sufficiently compressed by an external force applied to the idler; and wherein said second tubular member is positioned within said second spring, with one end of said second tubular member being contactable by said bracket and the other end of said second tubular member being contactable by said second holder when said second spring is compressed to a maximum desired compression by an external force applied to the idler.

19. A shock-absorbing device in accordance with claim 18, wherein, upon a removal of an external force applied to the idler, there is a gap between said first tubular member and said second holder.

20. A shock-absorbing device in accordance with claim 19, wherein, upon a removal of an external force applied to the idler, there is a gap between said second tubular member and said second holder.

* * * * *